(12) United States Patent
Travis et al.

(10) Patent No.: US 12,173,740 B2
(45) Date of Patent: Dec. 24, 2024

(54) FRANGIBLE DETENT PIN

(71) Applicant: Raytheon Company, Waltham, MA (US)

(72) Inventors: Robert D. Travis, Tucson, AZ (US); Justin Powell, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 986 days.

(21) Appl. No.: 16/930,233

(22) Filed: Jul. 15, 2020

(65) Prior Publication Data

US 2022/0018377 A1 Jan. 20, 2022

(51) Int. Cl.
F16B 31/00 (2006.01)
F16B 19/00 (2006.01)

(52) U.S. Cl.
CPC ............ F16B 31/00 (2013.01); F16B 19/002 (2013.01)

(58) Field of Classification Search
CPC .............................. F16B 31/00; F16B 19/002
See application file for complete search history.

(56) References Cited

U.S. PATENT DOCUMENTS

| | | |
|---|---|---|
| 3,790,104 A | 2/1974 | Jones |
| 3,797,956 A | 3/1974 | Bayer et al. |
| 4,373,688 A | 2/1983 | Topliffe |
| 4,521,201 A * | 6/1985 | Watanabe ............ B63H 20/12 |
| | | 74/495 |
| 4,701,141 A * | 10/1987 | Sumigawa ............ B63H 20/12 |
| | | 74/495 |
| 4,715,565 A | 12/1987 | Wittmann |
| 5,018,977 A * | 5/1991 | Wiley ............... G01M 17/0078 |
| | | 434/262 |
| 6,186,443 B1 | 2/2001 | Shaffer |
| 6,726,147 B1 * | 4/2004 | Perini ..................... F42B 10/64 |
| | | 244/3.28 |
| 9,568,038 B2 | 2/2017 | Donovan |
| 9,607,596 B2 | 3/2017 | Sood et al. |
| 10,605,290 B1 | 3/2020 | Roskwitalski |

(Continued)

FOREIGN PATENT DOCUMENTS

| | | |
|---|---|---|
| CN | 106323101 A | 1/2017 |
| DE | 10221975 A1 | 11/2003 |
| EP | 0171473 A1 | 2/1986 |

(Continued)

OTHER PUBLICATIONS

International Search Report for International Application No. PCT/US2021/032622 dated Dec. 20, 2021, 11 pages.

*Primary Examiner* — Vicky A Johnson

(57) ABSTRACT

A frangible detent pin comprising a base a pin head and an elastic member. The base is configured to be secured within a bore. The pin head and the base are interconnected through a frangible connection. The elastic member is configured to bias the pin head away from the base. The frangible detent pin has a rigid stage in which the pin head is rigidly positioned relative to the base and a spring-loaded stage in which the pin head is moveable relative to the base under a compression load between pin head and the base. The frangible detent pin is configured to transition from the rigid stage to the spring-loaded stage in response to the compression load exceeding a predetermined threshold sufficient to cause the frangible connection to fail.

21 Claims, 16 Drawing Sheets

(56) References Cited

U.S. PATENT DOCUMENTS

2006/0163423 A1\* 7/2006 Parine ................... F42B 10/14
  244/3.27
2010/0132955 A1 6/2010 Storm, Jr. et al.

FOREIGN PATENT DOCUMENTS

| GB | 1341985 A | 12/1973 |
| JP | H09-159398 A | 6/1997 |
| KR | 101931031 B1 | 12/2018 |
| KR | 101976720 B1 | 5/2019 |

\* cited by examiner

FRANGIBLE DETENT PIN

GOVERNMENT LICENSE RIGHTS

This invention was made with government support under contract FA8672-10-C-0002 awarded by the United States Department of Defense. The government has certain rights in the invention.

BACKGROUND

Spring-loaded detent pins are commonly used to hold a part in a temporary, fixed location relative to another part. The detent pin includes a pin head, typically having a spherical or hemispherical shape, which slides within a bore of a first part and is typically biased by spring force outward from the bore. A second part has a corresponding detent, such as a recess, that interacts with the pin head when the first and second part are in the temporary, fixed location. The pin head extends at least partially from the bore and into the detent of the second part, holding the parts in that position. When the pin is biased into engagement with its mating detent, any relative movement between the parts requires the pin to retract into the bore against the outward bias (i.e., overcoming the bias) as the pin head moves out of the detent.

The force that pushes the pin head back into the detent is resultant from lateral forces between parts and thus between the pin head and the detent. The pin head and/or the detent can have surfaces that are angled relative to the axis of the bore and that effectively function as an inclined plane, such that lateral forces result in an axial force on the pin head. The amount of lateral forces required to cause the pin head to retract into the bore can be controlled by either changing the outward bias of the pin head or by changing the angle of the inclined plane. A lower outward bias results in a lower lateral force required to depress the pin head. Similarly, a lower angle of the inclined plane results in a lower lateral force required to depress the pin head. Because the pin head is spherical, the angled surface that interacts with the detent varies depending on the relative depth of the detent. Near the axial end of the pin head the surface is shallow, whereas towards the lateral side of the pin head the angle is steep. Thus, a shallow detent will result in a higher axial force compared to a deeper detent for a given lateral force.

The amount of force required to depress the pin head is limited in practice. If the bias is too high, friction between the pin head and the second part may prevent the parts from moving relative to one another even when the pin head is not in the detent. If the angle is too steep, then the lateral force required to depress the pin head might exceed the shear strength of the parts. Thus, a detent pin is limited in how securely it can hold one part relative to another part. In some instances, a separate mechanism may be required to restrain or position a part in addition to the detent pin.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
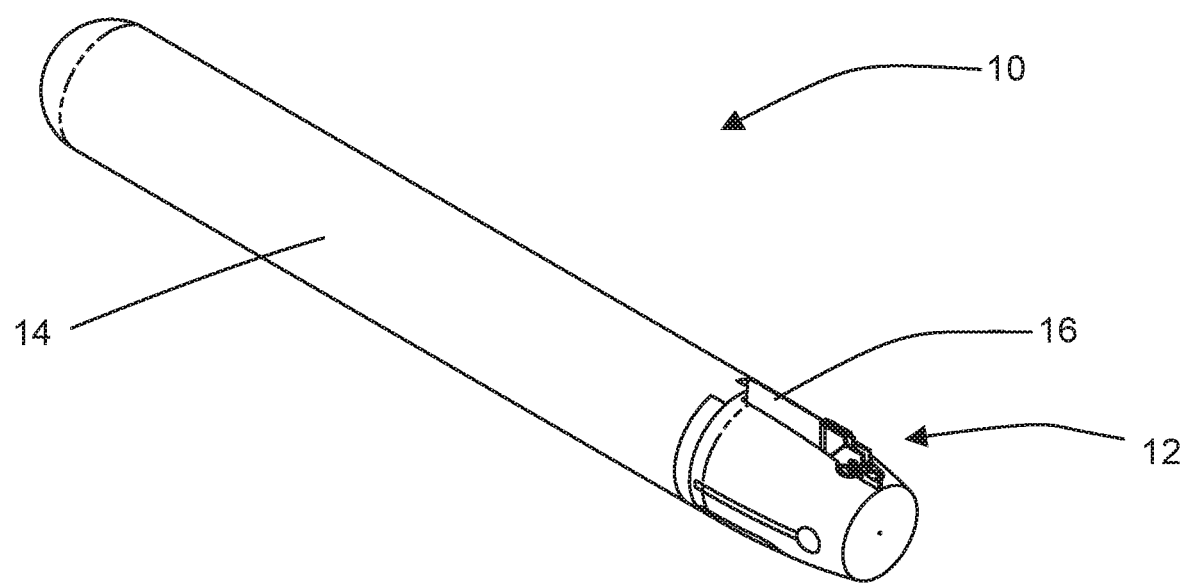
FIG. 1 illustrates a perspective view of an example system, in this case a missile system, comprising an example detent system for securing a moveable member in a first position or configuration, where the example detent system comprises a frangible detent pin used to secure a fin, as the moveable member, in a stowed configuration.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

In one example, disclosed is a frangible detent pin. The frangible detent pin comprises a base, a pin head, and an elastic member. The base is configured to be secured within a bore. The pin head and the base are interconnected through a frangible connection. The elastic member is configured to bias the pin head away from the base. The frangible detent pin has a rigid stage in which the pin head is rigidly positioned relative to the base and a spring-loaded stage in which the pin head is moveable relative to the base under a compression load between pin head and the base. The frangible detent pin is configured to transition from the rigid stage to the spring-loaded stage in response to the compression load exceeding a predetermined threshold sufficient to cause the frangible connection to fail.

In accordance with a more detailed aspect, the base can comprise an outer portion and an inner portion and the frangible connection can be defined by a connection between the outer portion and the inner portion configured to fail upon the compression load exceeding the predetermined threshold.

In accordance with a more detailed aspect, the outer portion can comprise a socket and the inner portion cam comprises a shaft. The shaft can be configured to displace into the socket upon the failure of the frangible connection (e.g., in one example, the breaking or fracture of the frangible connection). In accordance with a more detailed aspect, the shaft can comprise a radial ridge having an external diameter greater than an internal diameter of the socket.

In accordance with a more detailed aspect, the pin head can have a first portion and a second portion with an annular shoulder between the first portion and the second portion, and the first portion can comprise a hemispherical shape and the second portion can comprise a cylindrical shape.

Also disclosed is a system for securing a movable member. The system comprises a first member, a second member, and a frangible detent pin. The first member has a bore. The second member is moveably secured to the first member and has a first detent for securing the second member in a first configuration and a second detent for securing the second member in a second configuration. The frangible detent pin comprises a base secured within the bore, a pin head positioned at least partially within the bore and interconnected with the base through a frangible connection, and an elastic member configured to bias the pin head away from the base. The frangible detent pin has a rigid stage in which the pin head is rigidly positioned relative to the base and a spring-loaded stage in which the pin head is moveable relative to the base under a compression load, and the frangible detent pin changes or transitions from the rigid stage to the spring-loaded stage in response to a compression load exceeding a predetermined threshold sufficient to cause the frangible connection to fail.

In accordance with a more detailed aspect, the first member and the second member can be configured to position the bore adjacent the first detent with the system in a first configuration with the frangible detent pin in the rigid stage, such that the pin head extends into the first detent to secure the second member relative to the first member, and a second configuration with the frangible detent pin in the spring-loaded stage, such that the pin head extends into the second detent to secure the second member relative to the first member.

In accordance with a more detailed aspect, the pin head can comprise a hemispherical shaped end and the first detent can comprise a semi-hemispherical surface, and the second detent can comprise a semi-hemispherical surface. However, this is not intended to be limiting in any way as the pin head, and the detents in which these are inserted, can comprise other shapes and configurations other than hemispherical, such as flat, cone-shaped, dog point configuration, cup shaped and other shapes/configurations.

In accordance with a more detailed aspect, the first detent can comprise a shallow detent and the second detent can comprise a deep detent.

In accordance with a more detailed aspect, the shallow detent can be configured to apply a compressive load to the frangible detent pin to cause the frangible connection to fail.

In accordance with a more detailed aspect, the first and second members can be configured to rotate relative to one another.

In accordance with a more detailed aspect, the first and second members can be configured to translate relative to one another.

In accordance with a more detailed aspect, the system can further comprise a shear pin extending into the bore adjacent the pin head. The shear pin can be configured to define the frangible connection and to shear when the compressive load exceeds the predetermined threshold.

In accordance with another aspect, the first member can comprise a missile and the second member can comprise a missile fin.

In accordance with another aspect, the second member can rotate about a first axis relative to the first member and the bore can have a second axis perpendicular to the first axis.

Also disclosed is a method for configuring a frangible detent pin. forming a frangible detent pin to comprise a base configured to be secured within a bore, a pin head, wherein the pin head and the base are interconnected through a frangible connection, and an elastic member configured to bias the pin head away from the base. The frangible detent pin has a rigid stage in which the pin head is rigidly positioned relative to the base and a spring-loaded stage in which the pin head is moveable relative to the base under a compression load between pin head and the base, and the frangible detent pin is configured to transition from the rigid stage to the spring-loaded stage in response to the compression load exceeding a predetermined threshold sufficient to cause the frangible connection to fail.

In accordance with a more detailed aspect, the base can be formed to comprise an outer portion and an inner portion, and the frangible connection can be defined by a connection between the outer portion and the inner portion configured to break upon the compression load exceeding the predetermined threshold.

In accordance with a more detailed aspect, the outer portion can be formed to comprise a socket and the inner portion can be formed to comprise a shaft, and the shaft can be configured to displace into the socket upon the failure of the frangible connection.

In accordance with a more detailed aspect, the shaft can be formed to comprise a radial ridge having an external diameter greater than an internal diameter of the socket.

In accordance with a more detailed aspect, the pin head can be formed to have a first portion and a second portion with an annular shoulder between the first portion and the second portion, wherein the first portion comprises a hemispherical shape and the second portion comprises a cylindrical shape.

To further describe the present technology, examples are now provided with reference to the figures. FIGS. 1-14 describe an example system in the form of a missile or missile system 10 having a detent system 12 for securing a moveable member, in this example a deployable fin of the missile system 10. Although the system shown comprises a missile system, this is not intended to be limiting in any way. Indeed, the system can comprise any type of vehicle, object, structure, mechanism, or a combination of these where it is desired to secure a moveable member in one or more positions.

The missile 10 is shown as comprising a plurality of deployable fin (e.g., see deployable fin 16) that extend laterally from the body of the missile 10 and that function to stabilize and/or guide the missile 10 in flight. With the detent system 12, the fins can be positioned in a first configuration in which the fins are stowed (i.e., are not deployed) and do not extend outward from the missile body in order to facilitate packaging and transportation of the missile 10. The fins can be rotatably coupled to the missile body, and designed to rotate from the first configuration to a second configuration where the fins are extended and positioned in a deployed position for flight. The fins can be configured to remain in the first configuration until the missile 10 is fired, at which time the fins are deployed and positioned in the second configuration. The fins can transition from the first configuration to the second configuration as a result of a one-time, large external force. For example, an explosive charge may be used to force the fins from the first configuration when the missile 10 is fired. As will be shown in FIGS. 1-14, a frangible detent pin, as part of the detent system 12, can be used to position and secure a respective one of the fins in each of the first and second configurations while enabling the fins to transition between the first and second configurations. The frangible detent pin can hold the fins securely without the use of any secondary mechanisms, such as a clip or other retainer, while still allowing the fins to rotate between the first configuration and the second configuration. Additionally, the frangible detent pin can have the same overall dimensions as a conventional detent pin enabling the frangible detent pin to easily be substituted for a conventional detent pin.

FIG. 1 illustrates an example of a missile or missile system 10 that uses a detent system 12 for securing a moveable member, in this case a fin 16, which comprises one of the fins of the missile system 10, using a frangible detent pin. The missile system 10 includes a missile body 14, the missile fin 16, and the detent system 12 for securing the moveable member. Although a single missile fin 16 is shown in FIG. 1, one of ordinary skill in the art will recognize that additional missile fins can be used and that each missile fin can have a detent system for securing the respective one of the missile fins similar to the detent system 12 disclosed for the missile fin 16. The configuration shown in FIG. 1 with the fin 16 in the stowed configuration can be used to store and transport the missile 10.

Figure 2:
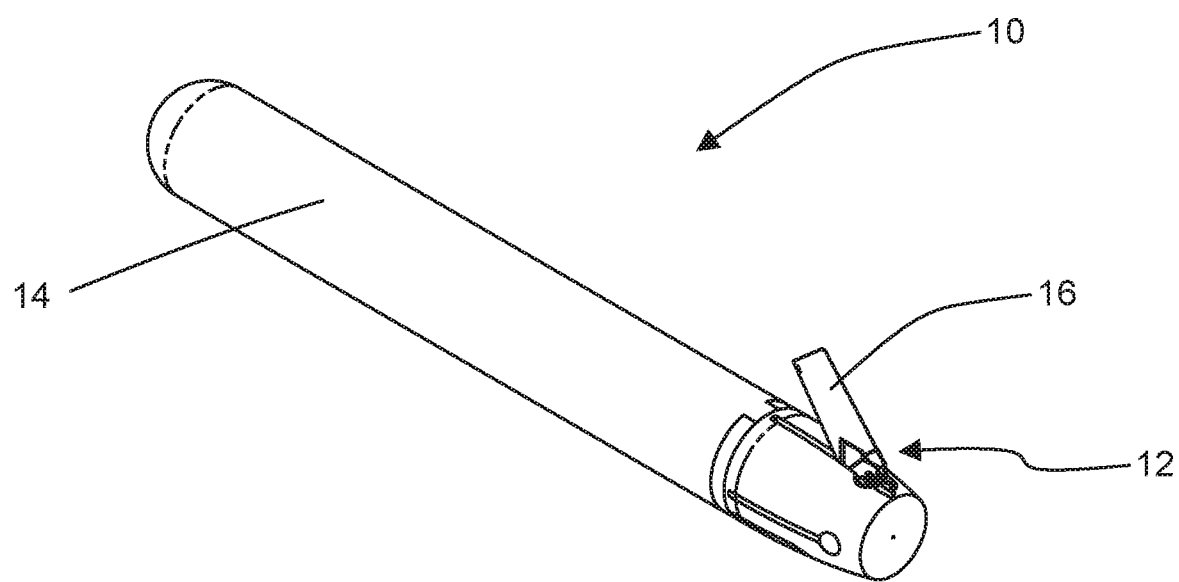
FIG. 2 illustrates a perspective view of the example system of FIG. 1, with the moveable member (e.g., the fin) in a partially deployed position between a first and second configuration or position.

FIG. 2 illustrates the missile 10 with the detent system 12 facilitating the missile fin 16 to be in a partially deployed position, such that the missile fin 16 is not in a fixed position but is free to move relative to the missile body 14 between the first and second available configurations or positions.

Figure 3:
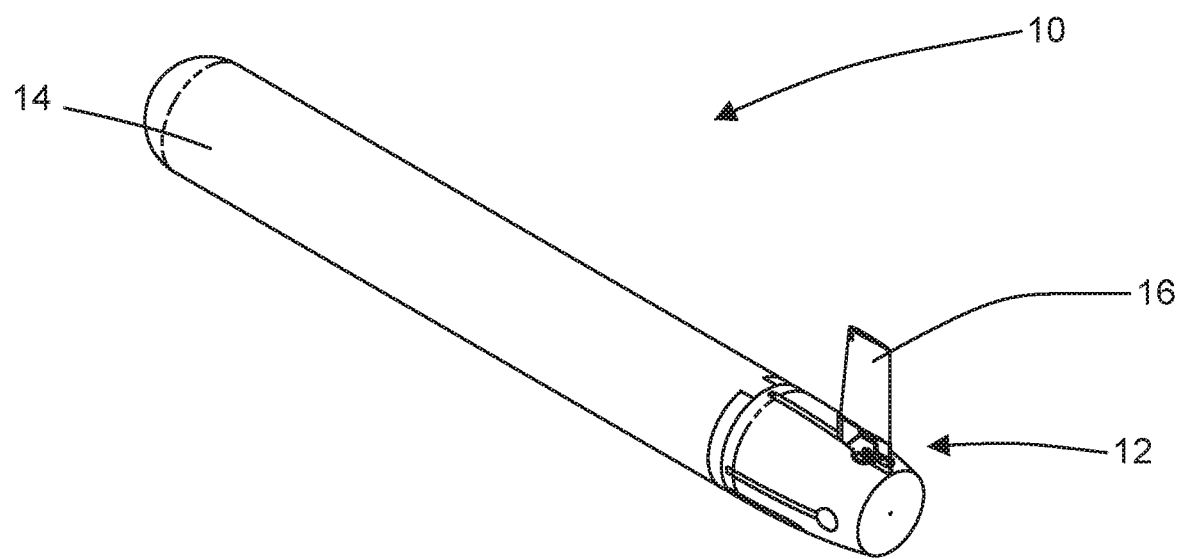
FIG. 3 illustrates a perspective view of the example system of FIG. 1, with the moveable member (e.g., the fin) in a second configuration or position (e.g., a fully deployed position).
Figure 4:
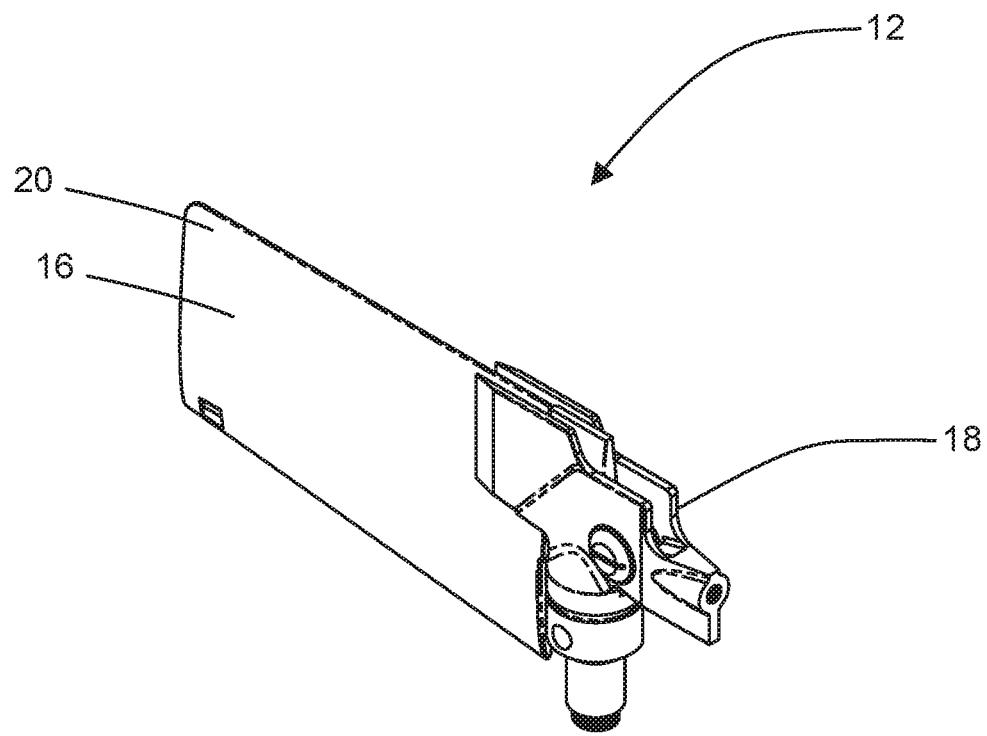
FIG. 4 illustrates a perspective view of the example detent system of the system (e.g., the missile system) of FIGS. 1-3 for securing the moveable member (e.g., the fin of the missile system) in a first configuration.
Figure 5:
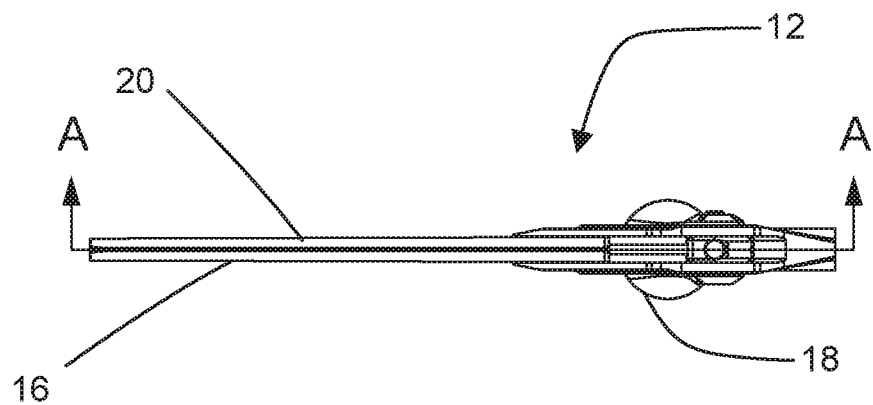
FIG. 5 illustrates a top view of the example detent system of FIG. 4.
Figure 6:
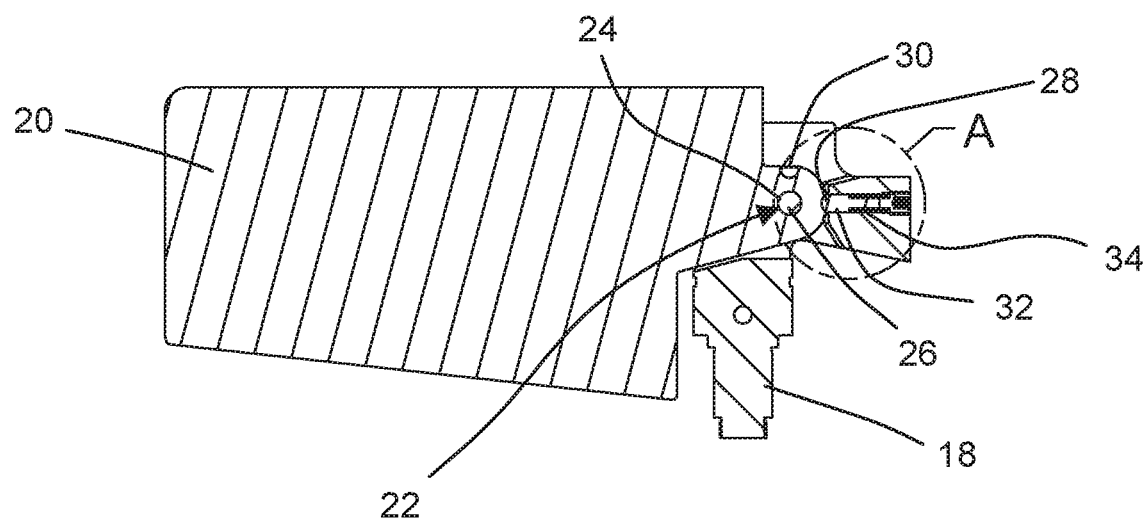
FIG. 6 illustrates a cross-sectional side view of the example detent system of FIG. 4, taken about line A-A of FIG. 5.
Figure 7:
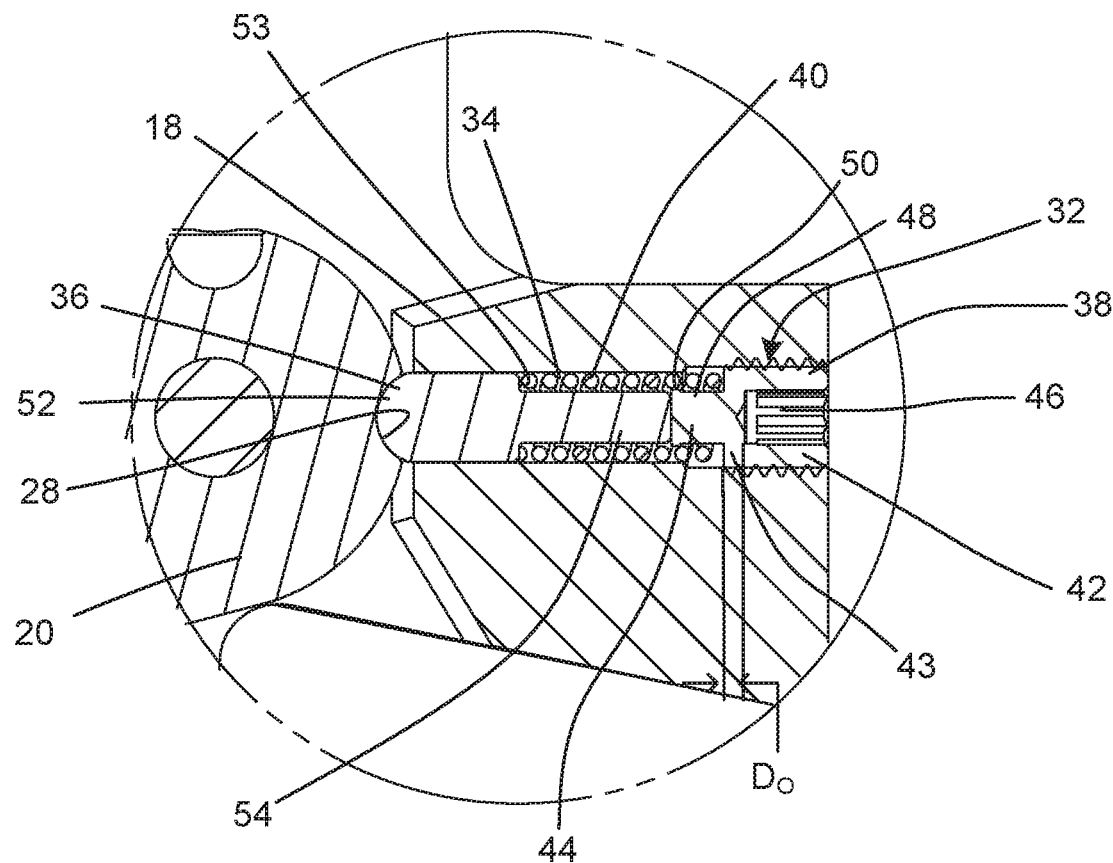
FIG. 7 illustrates a cross-sectional side view of a portion of the example detent system of FIG. 4 taken about detail A of FIG. 6.
Figure 8:
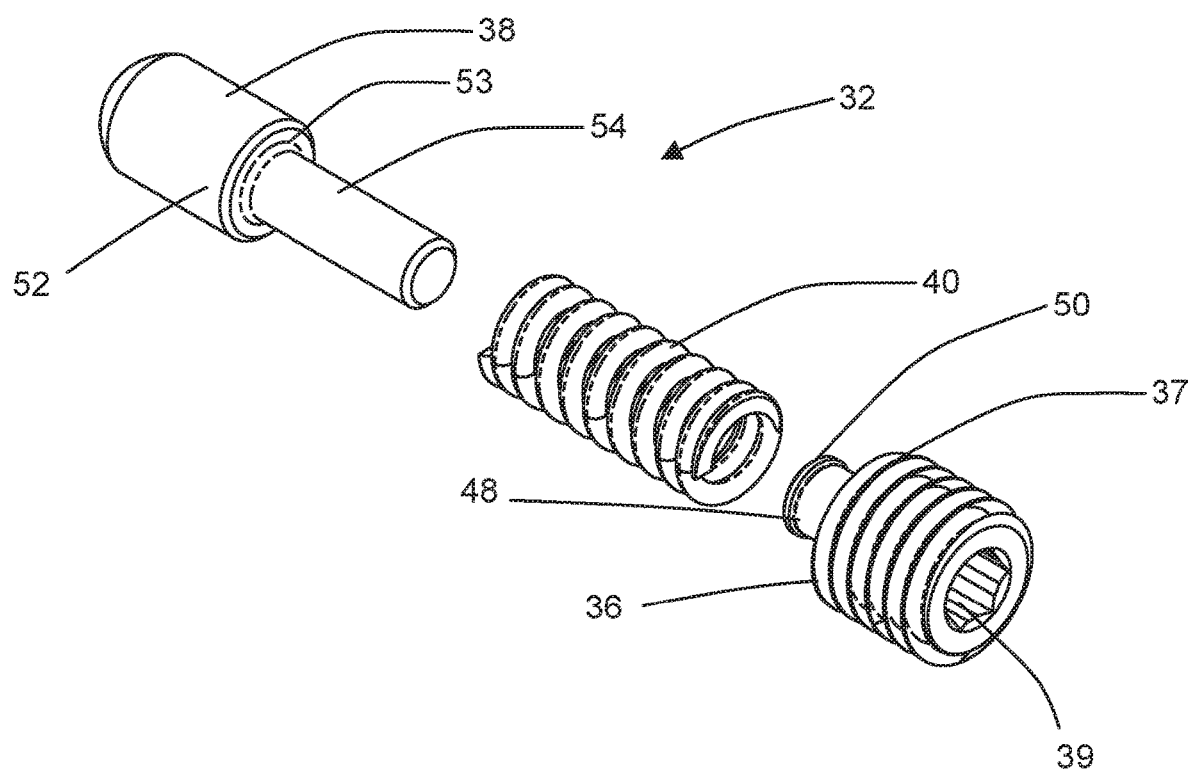
FIG. 8 illustrates a perspective, exploded view of the frangible detent pin of the detent system of FIG. 4.

FIG. 3 illustrates the missile 10 with the detent system 12 securing the missile fin 16 in the second position, in this case the fully deployed configuration. As will be shown in FIGS. 4-13 and discussed below, the detent system 12 comprises a frangible detent pin configured to maintain the missile fin 16 in the first configuration shown in FIG. 1 and the second configuration shown in FIG. 3, and to facilitate the transition between these configurations.

With reference to FIGS. 1-13, the example detent system 12 can be configured to secure the moveable member (e.g., the fin 16) relative to another structural component (e.g., a structural component of or coupled to the missile body 14 in the example missile system 10), and to facilitate the transition of the moveable member between one or more positions or configurations. The detent system 12 can comprise a first member 18, a second member 20, these being moveable relative to one another, and a frangible detent pin 32. The first member 18 can comprise a structural member part of or rigidly coupled to the system. In the example shown, the first member 18 can comprise a fin mount coupled to and supported by the missile body 14 using conventional techniques. The second member 20 can comprise the moveable member, in this example the missile fin 16, which rotatably couples to the fin mount. However, in other examples the structures may be reversed, with the first member corresponding to the missile fin 16 and the second member corresponding to the (e.g., the fin mount) being rigidly coupled to or part of the missile body 14.

As discussed, the detent system 12 can position the second member 20 in the first configuration, such as the position or configuration as shown in FIG. 1. The second member 20 can be rotatably secured to the first member 18 by a rotary coupling 22. For example, the second member 20 can have a bore 24 and the first member 18 can comprise a cross shaft 26 located in the bore 24. Thus, the second member 20 can rotate about the cross shaft 26 of the first member 18. The first member 18 can have a bore 34 housing the frangible detent pin 32. The bore 34 can have an axis that is perpendicular to a direction of travel of the second member 20 and be located at an interface between the first member 18 and the second member 20. For example, in rotating systems the axis of the bore 34 can be perpendicular to the axis of rotation (the axis into the page as shown) defined by the cross shaft 26 about which the second member 20 rotates. Or, in translating systems the bore can be perpendicular to an axis of translation.

The detent system 12 can further comprise one or more detents or discrete positioning features or members formed in or supported on at least one of the first or second members 18, 20. In the example shown, the second member 20 can comprise a first detent 28 for securing the second member 20 in a first configuration relative to the first member 18 (i.e., the configuration shown in FIG. 1) and a second detent 30 for securing the second member 20 in a second configuration relative to the first member 18 (i.e., the configuration shown in FIG. 3). Each of the detents 28, 30 can be defined by and formed in or supported on a surface or portion of structure of one or both of the first or second members 18 and 20 that is configured to receive and retain a pin head of the frangible detent pin 32 of the detent system 12 in a fixed location. The detents can comprise any configuration capable of receiving and retaining the pin head of the frangible detent pin 32 in a discrete position. For example, a detent can comprise a protruding ring of material extending above a surface of the structure of the second member 20, or a recess formed in a surface of the structure of the second member 20. In some examples, the detent can comprise a hemispherical shape or a partial hemispherical shape.

The frangible detent pin 32 can comprise a base 36, a pin head 38, and an elastic member 40 configured to bias the pin head 38 away from the base 36. The base 36 can be configured to secure the frangible detent pin 32 within the bore 34 of the first member 18 when the frangible detent pin 32 is assembled. In some examples, the base 36 can have external threads 37 and the bore 34 can have complementary internal threads to secure the frangible detent pin 32 to the first member 18 within the bore 34 using a threaded connection. The base 36 can further include features for receiving a torqueing tool such as a wrench. For example, the base 36 can have a socket 39 configured to receive a tool (e.g., a hex fastener driver) configured to tighten or loosen the base 36 of the frangible detent pin 32 within the bore 34 of the first member 18.

The pin head 38 and the base 36 can be directly or indirectly interconnected through a frangible connection or interface, such that the pin head is moveable relative to the base upon the failure of the frangible connection. A frangible connection can be referred to herein as a connection that is designed to fail at a predetermined load, which can be any load based on a particular application or need, or one that is desired. For example, a component may have a thinned section of material between two portions of the component and that is designed to fail when a load exceeds a predetermined threshold. In the example shown, the base 36 comprises an outer portion 42, and an inner portion 44, the inner portion 44 comprising a smaller diameter than the outer portion 42. The structural interface between the outer portion 42 and the inner portion 44 can be referred to as an overlapping portion 43, which can define the frangible connection and can be sized and shaped to fail upon an axial compression load between the outer portion 42 and the inner portion 44 exceeding a predetermined threshold. The predetermined threshold can be adjusted or tuned by varying the configuration of the structural interface or overlapping portion 43 between the outer portion 42 and the inner portion 44, such as the amount or distance of overlap, the overlap distance DO (see FIG. 7), between the inner portion 44 and the outer portion 42. For example, an overlap portion 43 having a smaller overlap distance DO between the inner and outer portions 42, 44 will result in fracture of the frangible detent pin 32 at a lower predetermined threshold compared with a higher predetermined threshold that would exist given the overlap portion 43 having a larger overlap distance DO (assuming all other parameters are the same). It is noted that the frangible connection can be configured and formed in a variety of ways other than as shown and described herein. For example the frangible connection can be formed and tuned using different materials or material segments, and others as will be recognized by those skilled in the art.

The outer portion 42 of the base 36 of the frangible detent pin 32 can comprise a socket 46 and the inner portion 44 of the base 36 can comprise a shaft 48 extending from the outer portion 42. The outer diameter of the shaft 48 can be undersized relative to a minimum inner diameter of the socket 46 such that the shaft 48 of the inner portion 44 can be received at least in part within the socket 46, thus forming the overlapping portion 43 of the base 36. Thus, after the frangible connection fails, the overall length of the base 36 shortens as the shaft 48 displaces further into the socket 46. This is described in more detail below, and shown more clearly in FIGS. 10 and 13.

The shaft 48 can have a radial ridge 50 at its end that has an outer diameter that is greater than the minimum inner diameter of the socket 46, and greater than the diameter of the remaining portion of the shaft 48. Thus, when the frangible connection fails and the shaft 48 displaces into the socket 46, the radial ridge 50 prevents the shaft 48 from escaping the socket 46 by interference (i.e., physical contact) between the outer portion 42 and the radial ridge 50. This prevents the shaft 48 from becoming loose within the missile 10 where the loose shaft 48 could potentially cause damage to other parts.

The frangible detent pin 32 can further comprise a pin head 38. The pin head 38 can comprise a first portion 52 and a second portion 54. The first portion 52 can comprise a cylindrically shaped shaft having a hemispherical shaped end for interacting with (i.e., being received within, contacting or otherwise engaging) a detent. The second portion 54 can comprise a cylindrically shaped shaft having a diameter less than that of the shaft of the first portion 52, such that an annular shoulder 53 is formed between the first portion 52 and the second portion 54.

It is noted herein that the pin head 38 frangible detent pin 32, namely the first portion 52 of the pin head 38, can comprise any shape or configuration other than hemispherical. Indeed, it is noted that although the present disclosure describes a pin head and associated detents as having a hemispherical shape, such is not intended to be limiting in any way as it is contemplated that the pin head 38 of the frangible detent pin 32, and any associated detents into which the pin head is intended to be inserted, can comprise any shape or configuration, such as flat with various angled surfaces, cup shaped, cone shaped, round, dog point configuration, and other shapes/configurations as will be recognized and appreciated by those skilled in the art.

The frangible detent pin 32 can further comprise an elastic member 40 situated between the annular shoulder 53 of the pin head 38 and the base 36. The elastic member 40 can be configured to bias (i.e., apply a directional force to) the pin head 38 away from the base 36. The elastic member 40 can comprise any type capable of applying a biasing force within the frangible detent pin 32. In the example shown, the elastic member 40 comprises a coil spring, but this is not intended to be limiting in any way.

The second portion 54 of the pin head 38 can contact the shaft 48 of the base 36 to interconnect the base 36 and the pin head 38. Thus, an axial compressive force applied to the pin head 38 is transmitted to the base 36 though the contact of the second portion 54 and the shaft 48. When a compressive load acting on the pin head 38 is less than the predetermined threshold compression load the interconnection between the pin head 38 and the base 36 acts as a rigid interconnection with the frangible detent pin 32 being in a rigid stage. Stated differently, the frangible connection is maintained. Conversely, when the compressive load exceeds the threshold compression load, the frangible connection fails and the frangible detent pin 32 enters a spring-loaded stage. In the spring-loaded stage the shaft 48 no longer resists movement of the pin head 38 since the shaft 48 is no longer coupled to the outer portion 42 of the base 36. Instead, the pin head 38 is moveable relative to the base 36 and the elastic member 40 biases the pin head 38 away from the base 36. This will be shown more clearly with respect to FIGS. 10 and 13.

The first detent 28 can be sized and configured as needed or desired. In one example, the first detent can comprise a shallow detent as compared with other detents. A shallow detent can be defined as a detent having a depth less than half of the radius of the hemispherical shape of the first portion 52 of the pin head 38. Thus, the angle at which the hemispherical shape interacts with a wall of the detent can be less than thirty degrees. Because the angled surfaces act as an inclined plane, the axial force acting on the frangible detent pin 32 can be double the lateral force between the first member 18 and the second member 20. Thus, the second member 20 can move relative to the first member 18 if a lateral force is sufficient to act on the frangible detent pin 32 to depress the frangible detent pin 32.

Figure 9:
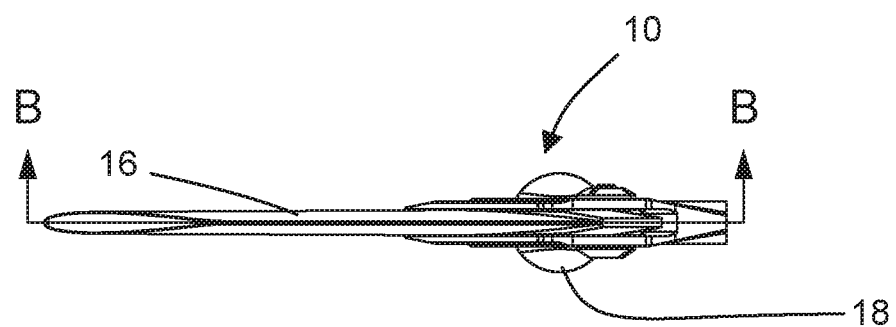
FIG. 9 illustrates a top view of the detent system of FIG. 4 with the moveable member (e.g., the fin of the missile system) in between a first configuration and a second configuration.
Figure 10:
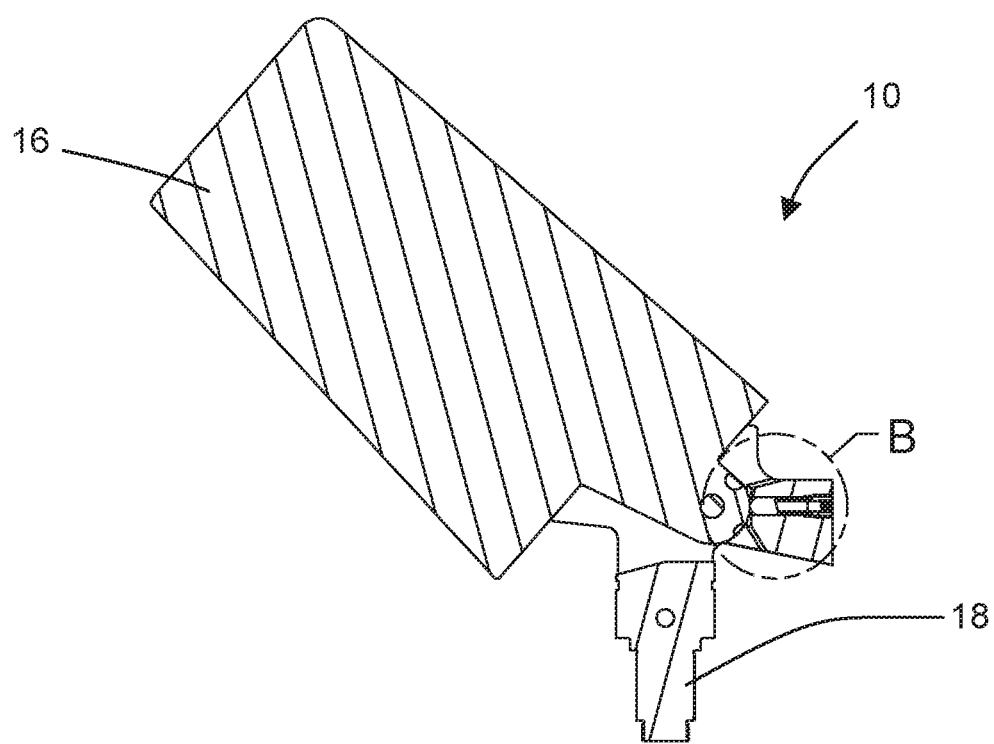
FIG. 10 illustrates a cross-sectional side view of the detent system of FIG. 4, taken about line B-B of FIG. 9, with the moveable member (e.g., the fin of the missile system of FIG. 1) in between a first configuration and a second configuration.
Figure 11:
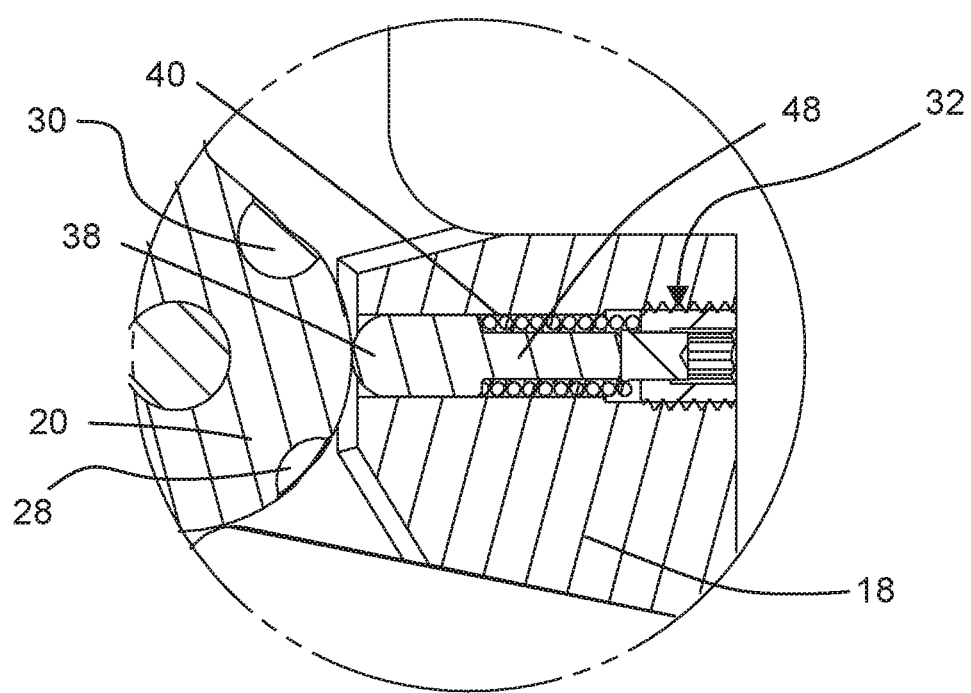
FIG. 11 illustrates a cross-sectional side view of a portion of the example detent system of FIG. 4 taken about detail B of FIG. 10 with the moveable member (e.g., the fin of the missile system) in between a first configuration and a second configuration.
Figure 12:
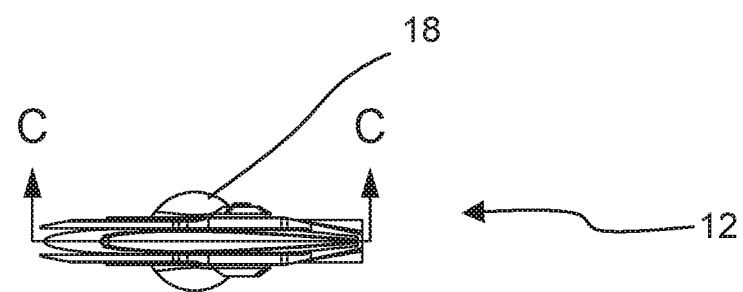
FIG. 12 illustrates a top view of the detent system of FIG. 4 with the moveable member (e.g., the fin of the missile system of FIG. 1) in a second configuration.
Figure 13:
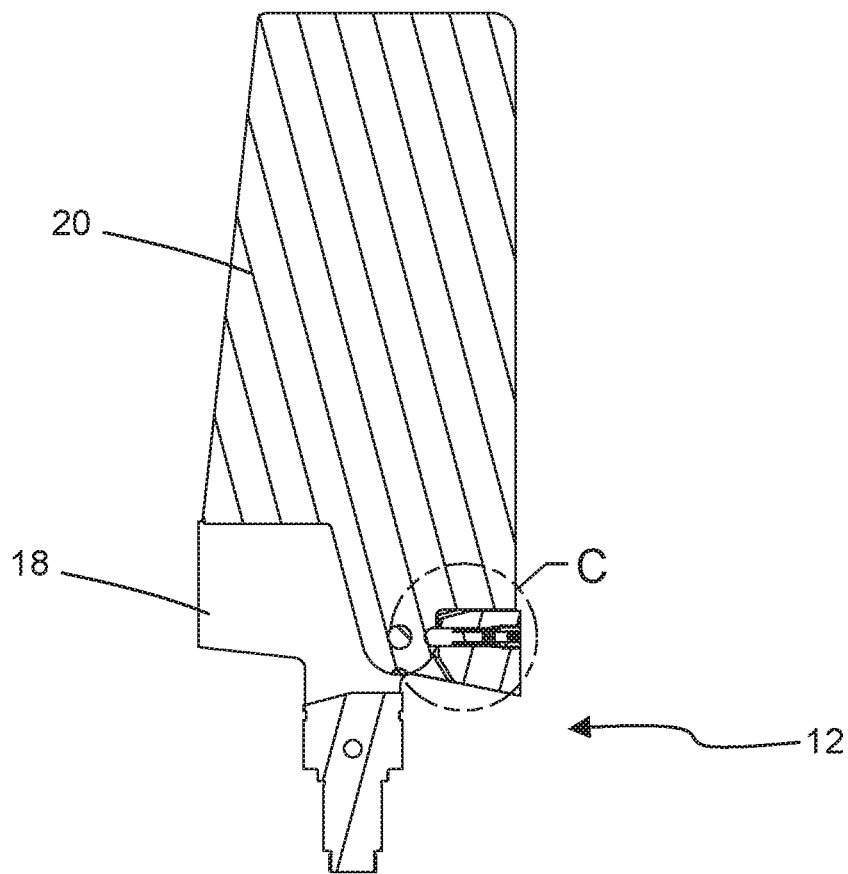
FIG. 13 illustrates a cross-sectional side view of the detent system of FIG. 4, taken about line C-C of FIG. 12, with the moveable member (e.g., the fin of the missile system of FIG. 1) in a second configuration.
Figure 14:
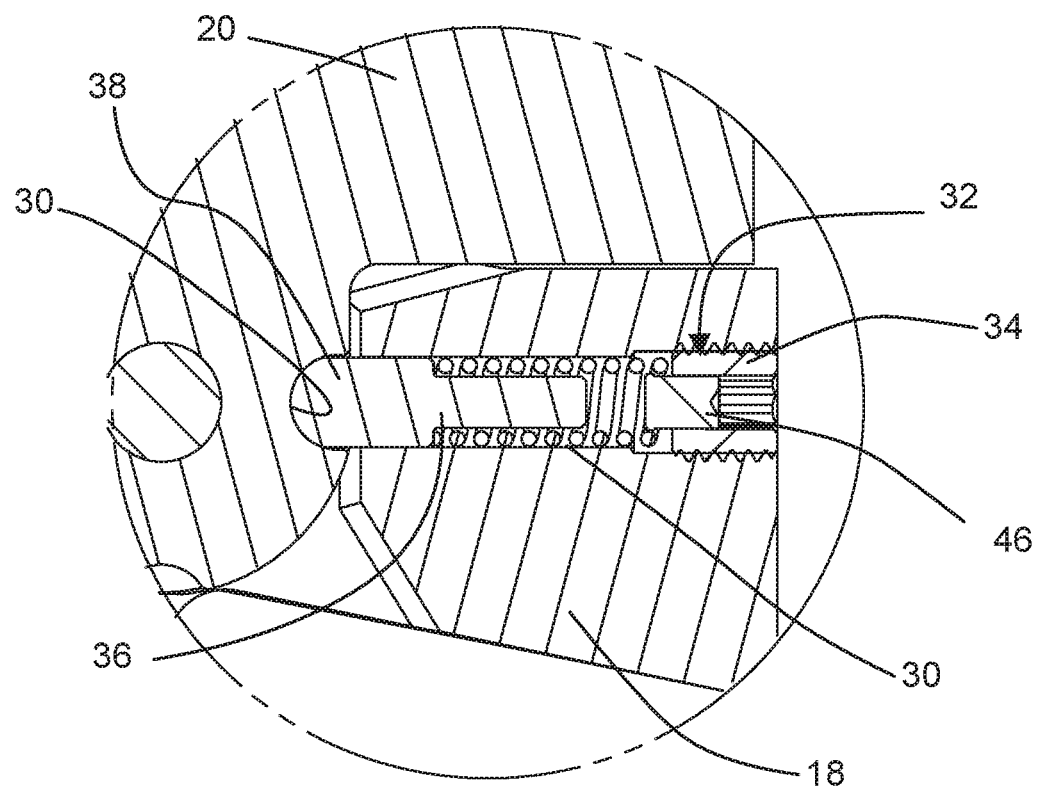
FIG. 14 illustrates a cross-sectional side view of a portion of the example detent system of FIG. 4 taken about detail C of FIG. 13, with the with the moveable member (e.g., the fin of the missile system of FIG. 1) in a second configuration.
Figure 15:
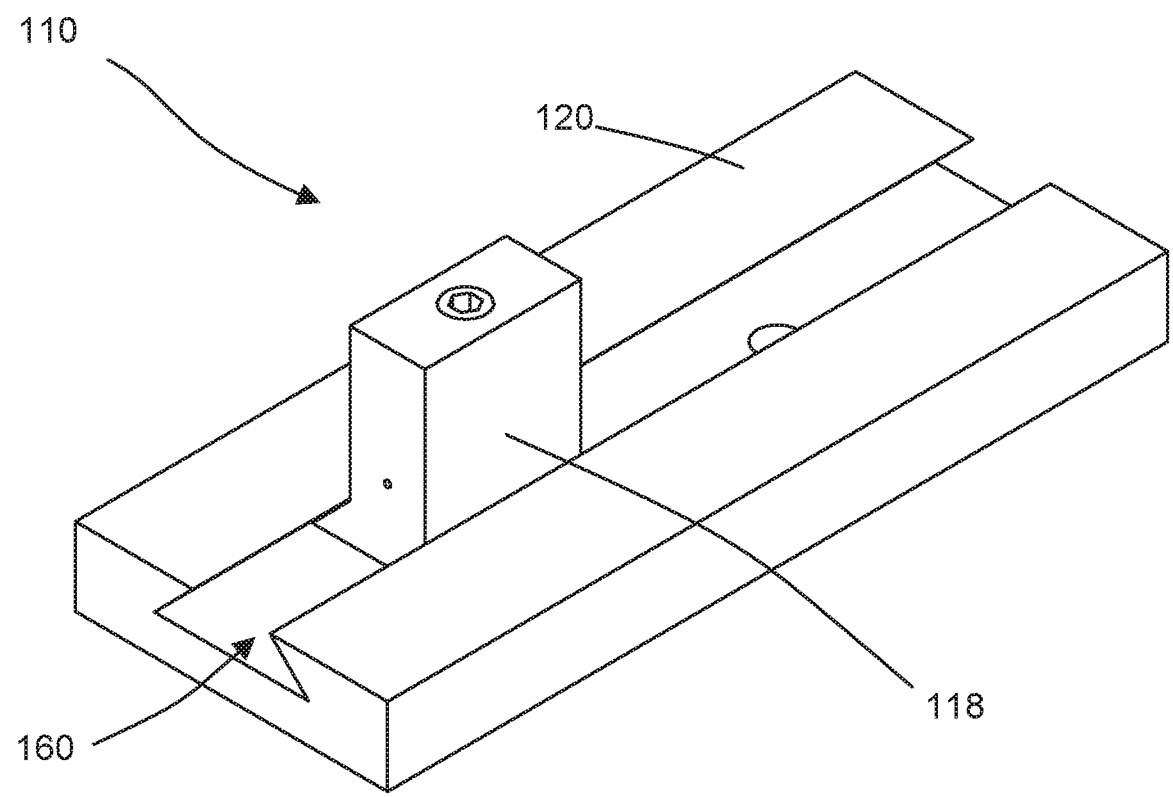
FIG. 15 illustrates a perspective view of a system comprising an example detent system for securing a moveable member, in accordance with an example of the present disclosure.

With the frangible detent pin 32 in the rigid stage (as shown in FIGS. 5-8), it is able hold the second member 20 in place within the first detent 28 even when subjected to a relatively large lateral force. However, when a lateral force is present that is sufficient to cause the axial compressive force acting on the frangible detent pin 32 to exceed the threshold compression load, the frangible connection fails, the frangible detent pin 32 transitions to the spring-loaded stage, and the second member 20 is able to rotate relative to the first member (as shown in FIGS. 9-11).

With the frangible connection of the frangible detent pin 32 fractured, the shaft 48 is caused to displace into the socket 46 of the outer portion 42. Under the applied compression load, the elastic member 40, in this example a spring, compresses causing the pin head 38 to retract into the bore 34 of the first member 18 and out of the first detent 28 where the second member 20 is able to rotate relative to the first member 18 as intended. The elastic member 40 provides the frangible detent pin 32 with a spring constant in the spring-loaded stage, where the pin head 38 and the base 36 are able to move relative to one another under a spring load compared to the rigid behavior of the frangible detent pin 32 in the rigid stage where the pin head 38 and the base 36 model a rigid rod (i.e., behave rigidly) due to the frangible connection between them. Without the spring-loaded stage, the second member 20 would not rotate relative to the first member 18 without damaging one or both of the first and/or second members 18 and 20 or the frangible detent pin 32 due to high frictional forces between the pin head 38 and the second member 20.

Once the threshold compression load is reached causing the frangible connection to fracture or fail, and once the frangible detent pin 32 transitions to the spring-loaded stage, rotation of the second member 20 can be initiated, wherein the frangible detent pin 32 is caused to move out of the first detent 28. Further rotation of the second member 20 can cause the frangible detent pin 32 to ride along a surface of the second member 20 as the elastic member 40 applies a biasing force to the shaft 48 of the frangible detent pin 32 causing the shaft 48 to remain in the socket 46 of the base 36 of the frangible detent pin 32. Upon further rotation of the second member 20, and upon the frangible detent pin 32 reaching a second detent (e.g., the second detent 30 in the example shown), the elastic member 40 functions to bias the pin head 38 of the frangible detent pin 32 into the second detent 30, or in other words, the pin head 38 is caused to be inserted into the second detent 30, thus securing the second member 20 in a discrete position relative to the first member 18. The second detent 30 can be any size and configuration suitable for the intended purpose. In one example, the second detent 30 can comprise a deeper configuration than the first detent 28 that secures the second member 20 in a discrete position relative to the first member 18. In contrast to a shallow detent, a deeper detent, comparatively speaking, is a detent having a depth or radius that is the same (or substantially the same as) or greater than the radius of the hemispherical shape of the first portion 52. Thus, the angle at which the hemispherical shape interacts with a wall of the detent is a substantially right angle. Therefore, any lateral forces between the first member 18 and the second member 20 do not translate into compressive axial forces that would displace the pin head 38 of the frangible detent pin 32, and thus the frangible detent pin 32 secures the second member 20 laterally relative to the first member 18.

It is noted that the detent system can comprise any number of detents, and also that the detents can comprise any needed or desired depth. Indeed, the detents in a particular detent system can comprise constant or the same depths, differing depths, and these can be present in any number. As such, the number, configuration and depth of the specific detents discussed herein is not intended to be limiting in any way.

Figures 16, 17:
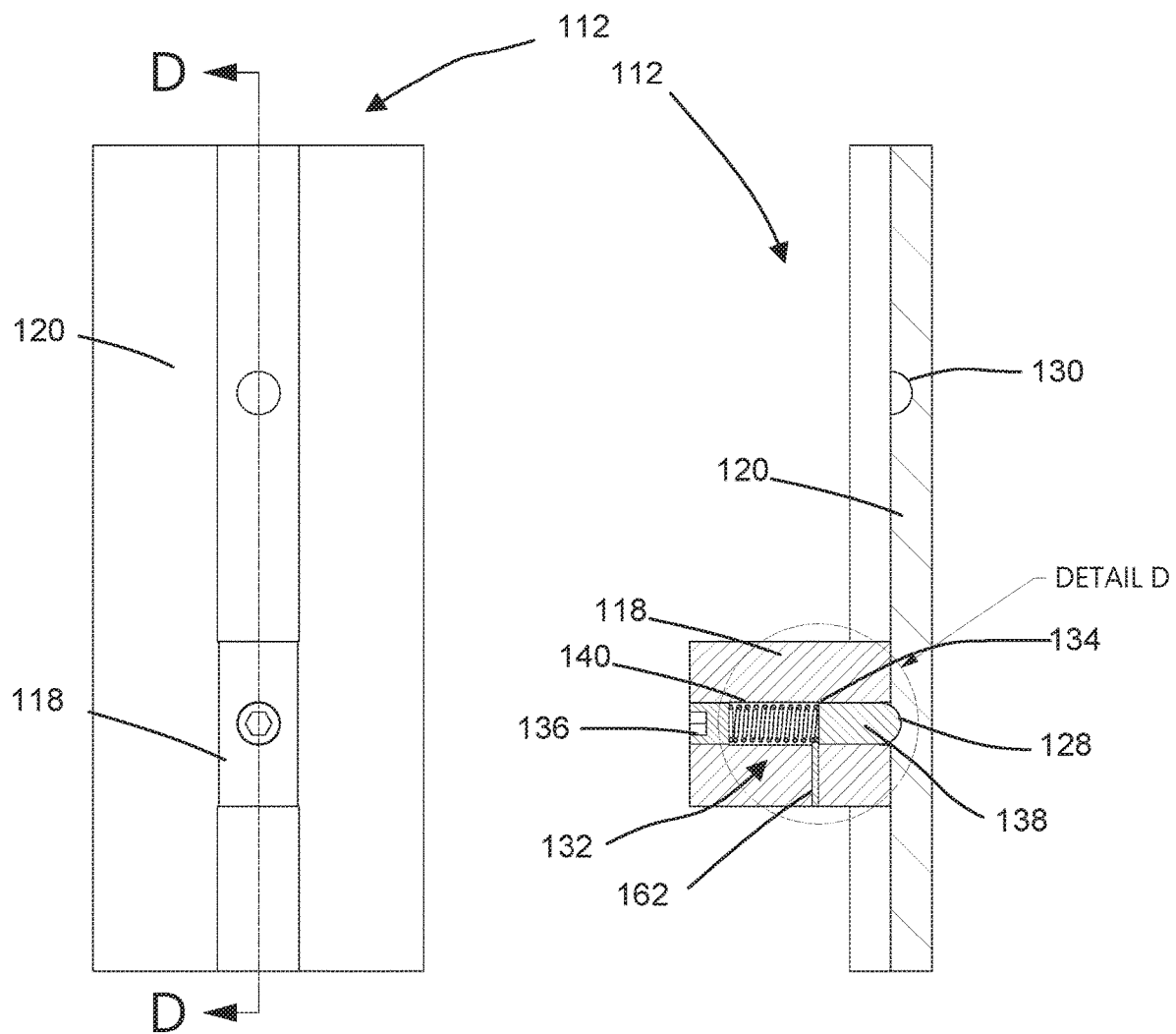
FIG. 16 illustrates a top view of the system of FIG. 15, with the moveable member in a first configuration.
FIG. 17 illustrates a cross-section of the system of FIG. 15, taken about line D-D of FIG. 16.
Figure 18:
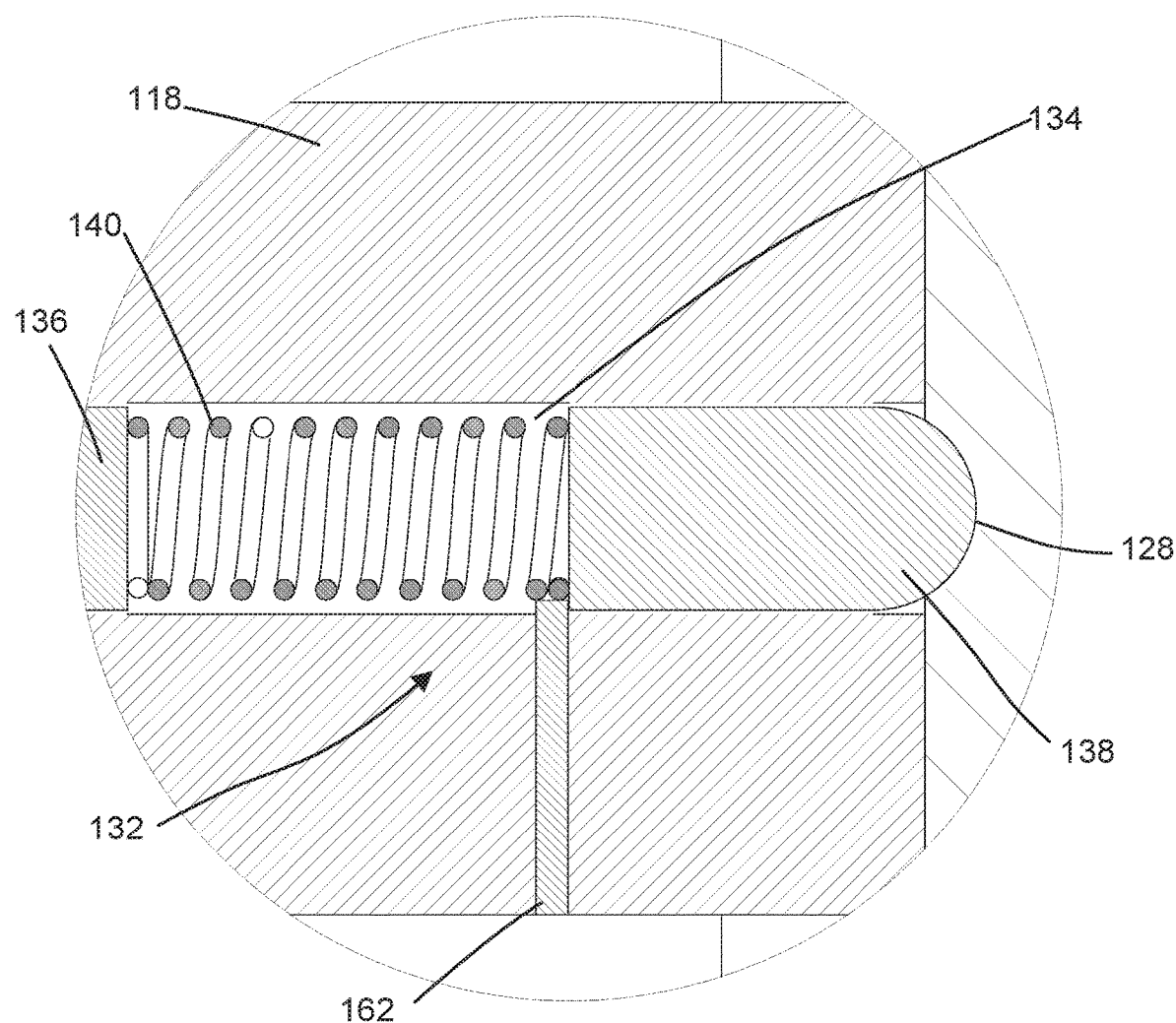
FIG. 18 illustrates a cross-sectional side view of a portion of the example detent system of FIG. 17 taken about detail D of FIG. 17.
Figures 21, 22:
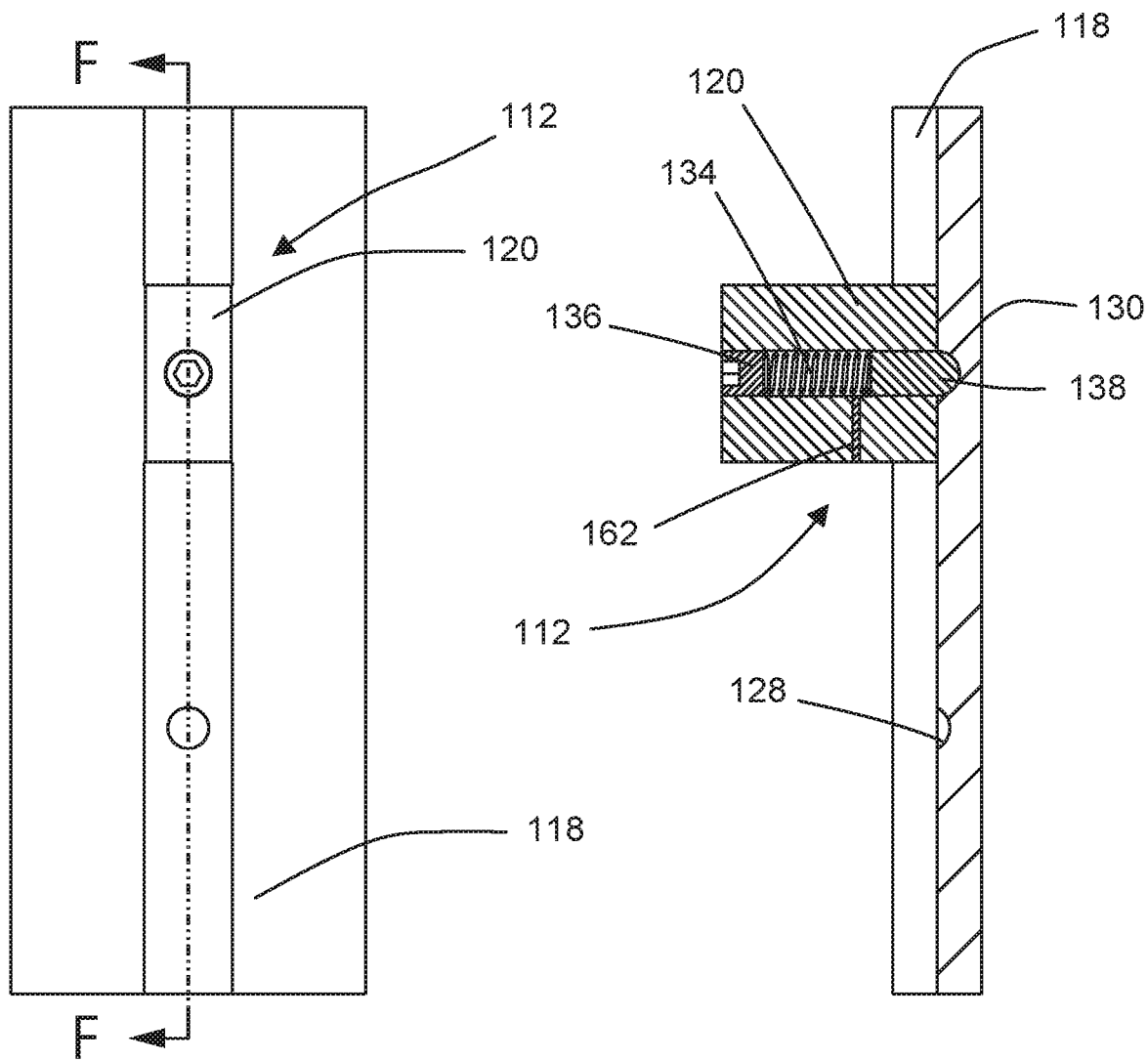
FIG. 21 illustrates a top view of the system of FIG. 15, with the moveable member in a second configuration.
FIG. 22 illustrates a cross-section of the system of FIG. 15, taken about line F-F of FIG. 21.

FIGS. 15-22 illustrate a system 110 for securing a moveable member in accordance with another example of the present invention. In this example, the system 110 comprises a first member 118 moveably secured to a second member 120 in a sliding configuration, and a detent system 112 operable with the first and second members 118. The detent system 112 is similar in some respects to the detent system 12 described above, but comprises some differences as discussed below. The first member 118 translates relative to the second member 120 along a channel 160. The detent system 112 can comprise, and the first member 118 can be secured in a first configuration by, a frangible detent pin 132 (as shown in FIGS. 17 and 18). The first member 118 can translate to, and can be secured within, a second configuration (as shown in FIG. 21) when a sufficient lateral force is applied between the first member 118 and the second member 120 to force the frangible detent pin 132 to fracture its frangible connection (discussed below) and to enter a spring-loaded stage, similar to the spring-loaded stage described above.

The first member 118 can comprise a bore 134 for supporting and securing the frangible detent pin 132. The detent system 112 can comprise a first detent 128 formed in the second member 120 for securing the first member 118 in the first configuration (shown in FIGS. 15-18), and a second detent 130 for securing the first member 118 in a second configuration (shown in FIGS. 21-22). The first detent 128 can be a shallow detent and the second detent 130 can be a deeper detent, similar to the first and second detents described above. The frangible detent pin 132 can comprise a base 136, a pin head 138 interconnected with the base 136, and an elastic member 140 biasing the pin head 138 away from the base 136. The detent system 112 can further comprise a shear pin 162 supported within the first member 118, which can extend into the bore 134 so as to be positioned adjacent the pin head 138. Interference between the pin head 138 and the shear pin 162 causes the frangible detent pin 132 to be rigidly positioned relative to the first member 118, and consequently the base 136 is secured in the bore 134 of the first member 118. The shear pin 162 forms a frangible connection between the base 136 and the pin head 138 such that the pin head 138 is rigidly located relative to the base 136 until the shear pin 162 fails. The shear pin 162 is configured to shear (fail) when the axial compressive force exerted on the pin head 138 exceeds a predetermined threshold. The predetermined threshold can be varied by changing the diameter of the shear pin 162 and/or the material of the shear pin 162.

Figures 19, 20:
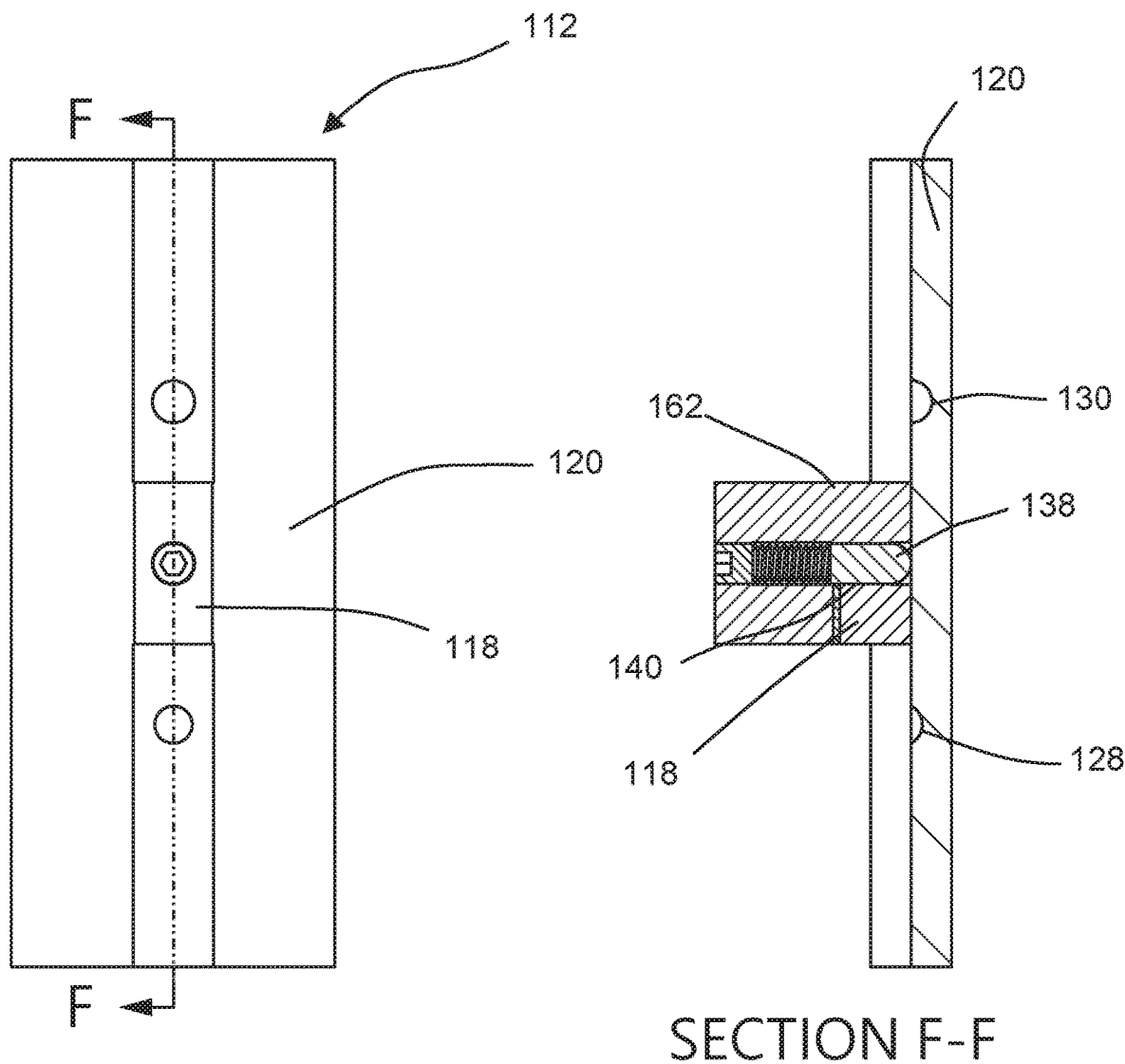
FIG. 19 illustrates a top view of the system of FIG. 15 with the moveable member positioned between a first configuration and a second configuration.
FIG. 20 illustrates a cross-section of the system of FIG. 15, taken about line E-E of FIG. 19.

As long as the shear pin 162 has not been sheared, the frangible detent pin 132 is in a rigid stage and lateral forces between the first and second members 118, 120 will not result in relative lateral movement between the first and second members 118, 120 due to interference between the sides of the first detent 128 and the pin head 138. Because the first detent 128 can be a shallow detent, lateral forces can exert a corresponding compressive force on the pin head 138. If the corresponding compressive force exceeds the axial compressive threshold, the shear pin 162 fails and the frangible detent pin 132 enters a spring-loaded stage, wherein the first and second members 118, 120 can move relative to one another. Indeed, upon shearing of the shear pin 162, the shear pin 162 no longer interferes with the pin head 138 and the pin head 138 can be retracted into the bore 134. Once the shear pin 162 fails, lateral forces acting on the first member 118 can cause the first member 118 to move relative to the second member 120, facilitated by the pin head 138 of the frangible detent pin 132 being displaced and able to move out of the first detent 128. Further sliding movement of the first member 118 relative to the second member 120 can cause the pin head 138 of the frangible detent pin 132 to slide about the surface of the second member 120 between the first detent 128 and a second detent 130 (as shown in FIGS. 19 and 18).

Still further sliding of the first member 118 into a position about the second detent 130 can cause the pin head 138 to be received within the second detent 130 as a result of the biasing force acting on the pin head 138 by the elastic member 140 (a coil spring in this case), thus securing the first member 118 in the second configuration. Because the second detent 130 can be a deeper detent than the first detent 128, lateral forces between the first and second members 118, 120 do not translate into substantial axial compression loads that would cause the pin head 138 to displace out of the second detent 130 as compared to those acting on the pin head 138 when received within the first detent 128. Thus, the frangible detent pin 132 secures the first member 118 relative to the second member 120 in the second configuration.

The various detent systems described herein utilize a frangible detent pin to secure a moveable member in various positions relative to another member, such as a stationary member. In the examples described herein, the frangible detent pin provides for two different spring constants based on the status of the frangible connection, and whether or not this has been fractured or has failed. The first spring constant where the frangible detent pin models or behaves as a rigid rod (referred to as the rigid stage herein) can be used with a shallow detent to rigidly position the moveable member in a first configuration or position. The second spring constant can be achieved upon the failure of the frangible connection where the frangible detent pin transitions to a spring-loaded stage, wherein the frangible detent pin can be used to allow the moveable member to transition from the first configuration to a second configuration, the frangible detent pin being received within a deep detent to fixedly position the moveable member in the second configuration.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A frangible detent pin comprising:
    a base configured to be secured within a bore, the base comprising an outer portion and an inner portion;
    a pin head, wherein the pin head and the base are interconnected through a frangible connection; and
    an elastic member configured to bias the pin head away from the base,
    wherein the frangible detent pin has a rigid stage in which the pin head is rigidly positioned relative to the base and a spring-loaded stage in which the pin head is moveable relative to the base under a compression load between the pin head and the base,
    wherein the frangible detent pin is configured to transition from the rigid stage to the spring-loaded stage in response to the compression load exceeding a predetermined threshold sufficient to cause the frangible connection to fail, and
    wherein the frangible connection comprises a connection between the outer portion and the inner portion that is configured to fail upon the compression load exceeding the predetermined threshold.

2. The frangible detent pin of claim 1, wherein the outer portion comprises a socket and the inner portion comprises a shaft, and the shaft is configured to displace into the socket upon failure of the frangible connection.

3. The frangible detent pin of claim 2, wherein the shaft comprises a radial ridge having an external diameter greater than an internal diameter of the socket.

4. The frangible detent pin of claim 1, wherein the pin head comprises a first portion and a second portion with an annular shoulder between the first portion and the second portion, wherein the first portion comprises a hemispherical shape and the second portion comprises a cylindrical shape.

5. A system for securing a movable member, the system comprising:
   a first member having a bore;
   a second member moveably secured to the first member, the second member having a first detent for securing the second member in a first configuration and a second detent for securing the second member in a second configuration; and
   a frangible detent pin, the frangible detent pin comprising:
      a base secured within the bore, the base comprising an outer portion and an inner portion;
      a pin head positioned at least partially within the bore and interconnected with the base through a frangible connection; and
      an elastic member configured to bias the pin head away from the base,
   wherein the frangible detent pin has a rigid stage in which the pin head is rigidly positioned relative to the base and a spring-loaded stage in which the pin head is moveable relative to the base under a compression load between the pin head and the base,
   wherein the frangible detent pin is configured to transition from the rigid stage to the spring-loaded stage in response to the compression load exceeding a predetermined threshold sufficient to cause the frangible connection to fail, and
   wherein the frangible connection comprises a connection between the outer portion and the inner portion that is configured to fail upon the compression load exceeding the predetermined threshold.

6. The system of claim 5, wherein the first member and the second member are configured to position the bore adjacent the first detent with the system in a first configuration with the frangible detent pin in the rigid stage such that the pin head extends into the first detent to secure the second member relative to the first member, and a second configuration with the frangible detent pin in the spring-loaded stage such that the pin head extends into the second detent to secure the second member relative to the first member.

7. The system of claim 5, wherein the pin head comprises a hemispherical shaped end, the first detent comprises a semi-hemispherical surface, and the second detent comprises a semi-hemispherical surface.

8. The system of claim 5, wherein the first detent comprises a first depth and the second detent comprises a second depth different from the first depth.

9. The system of claim 8, wherein the first detent is configured to apply a compressive force to the frangible detent pin sufficient to cause the frangible connection to fail.

10. The system of claim 5, wherein the first and second detents comprise the same depth.

11. The system of claim 5, wherein the first and second members are configured to rotate relative to one another.

12. The system of claim 5, wherein the first and second members are configured to translate relative to one another.

13. The system of claim 5, further comprising a shear pin extending into the bore adjacent the pin head to define the frangible connection, wherein the shear pin is configured to shear when the compression load exceeds the predetermined threshold.

14. The system of claim 5, wherein the second member is configured to rotate about a first axis relative to the first member and wherein the bore has a second axis perpendicular to the first axis.

15. The system of claim 5, wherein:
   the outer portion comprises a socket;
   the inner portion comprises a shaft; and
   the shaft is configured to displace into the socket upon failure of the frangible connection.

16. The system of claim 15, wherein the shaft comprises a radial ridge having an external diameter greater than an internal diameter of the socket.

17. The system of claim 5, wherein:
   the pin head comprises a first portion and a second portion with an annular shoulder between the first portion and the second portion;
   the first portion comprises a hemispherical shape; and
   the second portion comprises a cylindrical shape.

18. A method comprising:
   forming a frangible detent pin, the frangible detent pin comprising:
      a base configured to be secured within a bore, the base comprising an outer portion and an inner portion;
      a pin head, wherein the pin head and the base are interconnected through a frangible connection; and
      an elastic member configured to bias the pin head away from the base,
   wherein the frangible detent pin has a rigid stage in which the pin head is rigidly positioned relative to the base and a spring-loaded stage in which the pin head is moveable relative to the base under a compression load between the pin head and the base,
   wherein the frangible detent pin is configured to transition from the rigid stage to the spring-loaded stage in response to the compression load exceeding a predetermined threshold sufficient to cause the frangible connection to fail, and
   wherein the frangible connection comprises a connection between the outer portion and the inner portion that is configured to fail upon the compression load exceeding the predetermined threshold.

19. The method of claim 18, wherein the outer portion is formed to comprise a socket and the inner portion is formed to comprise a shaft, and the shaft is configured to displace into the socket upon failure of the frangible connection.

20. The method of claim 19, wherein the shaft is formed to comprise a radial ridge having an external diameter greater than an internal diameter of the socket.

21. The method of claim 18, wherein the pin head is formed to have a first portion and a second portion with an annular shoulder between the first portion and the second portion, wherein the first portion comprises a hemispherical shape and the second portion comprises a cylindrical shape.

* * * * *